United States Patent
O'Grady et al.

(10) Patent No.: US 11,593,335 B2
(45) Date of Patent: Feb. 28, 2023

(54) AUTOMATICALLY DEFINING ARRIVAL RATE METERS

(71) Applicant: Teradata US, Inc, San Diego, CA (US)

(72) Inventors: Kristi O'Grady, Carlsbad, CA (US); Modie Christon Smith, San Diego, CA (US); Ruth Gladys Fenwick, Etobicoke (CA); Douglas P. Brown, Rancho Santa Fe, CA (US); Ryan Speed, Lancaster, CA (US)

(73) Assignee: Teradata US, Inc., San Diego, CA (US)

( * ) Notice: Subject to any disclaimer, the term of this patent is extended or adjusted under 35 U.S.C. 154(b) by 306 days.

(21) Appl. No.: 16/730,651

(22) Filed: Dec. 30, 2019

(65) Prior Publication Data

US 2020/0379964 A1  Dec. 3, 2020

Related U.S. Application Data

(60) Provisional application No. 62/855,513, filed on May 31, 2019.

(51) Int. Cl.
*G06F 16/21* (2019.01)

(52) U.S. Cl.
CPC .................................. *G06F 16/217* (2019.01)

(58) Field of Classification Search
CPC ............... G06F 16/217; G06F 11/3419; G06F 11/3495; G06F 11/3452; G06F 2201/86; H04L 47/12; H04L 47/20; H04L 47/22; H04L 47/225
See application file for complete search history.

(56) References Cited

U.S. PATENT DOCUMENTS

| | | | |
|---|---|---|---|
| 7,805,436 B2 | 9/2010 | Richards et al. | |
| 9,015,718 B1* | 4/2015 | Zhang | G06F 9/5022 718/100 |
| 2003/0115118 A1* | 6/2003 | Reinemann | G06Q 40/12 705/30 |
| 2010/0145929 A1* | 6/2010 | Burger | G06F 16/24545 707/713 |
| 2017/0031715 A1* | 2/2017 | Willis | G06F 9/4881 |

OTHER PUBLICATIONS

Kejariwal, Arun, Breakout detection in the wild, pp. 1-5, Oct. 24, 2014, https://blog.twitter.com/engineering/en_us/a/2014/breakout-detection-in-the-wild.html.

* cited by examiner

*Primary Examiner* — Marc S Somers
(74) *Attorney, Agent, or Firm* — Howard Speight

(57) ABSTRACT

A determination is made that a database system is resource bound resulting in a resource bound condition. Signals for the resources being bound in the database system are identified. Events associated with the signals are extracted. Events are correlated temporally to identify a time interval for which an arrival rate meter (ARM) is helpful. Database system segments are selected that effect key performance indicators associated with the identified time interval. Parameters for the selected database system segments to be deferred by the database system are estimated. The estimated parameters are incorporated into an arrival rate meter (ARM). The ARM is put into effect.

14 Claims, 7 Drawing Sheets

AUTOMATICALLY DEFINING ARRIVAL RATE METERS

CROSS-REFERENCE TO RELATED APPLICATIONS

This application claims the benefit of U.S. Provisional Patent Application No. 62/855,513, entitled "Automatically defining Arrival Rate Meters (ARMs) for Teradata Active System Management (TASM)," filed on May 31, 2019, which is incorporated by reference in its entirety.

BACKGROUND

A database management system may receive many requests (or queries) simultaneously or in a short period time that may clog a delay queue or throttling system in the database management system and result in long delays for other requests. Handling large numbers of database requests without generating long delays for other database requests is a challenge.

SUMMARY

In one aspect, a method includes determining that a database system is resource bound resulting in a resource bound condition. The method includes identifying signals for the resources being bound in the database system. The method includes extracting events associated with the signals. The method includes correlating events temporally to identify a time interval for which an arrival rate meter (ARM) is helpful. The method includes selecting database system segments that effect key performance indicators associated with the identified time interval. The method includes estimating parameters for the selected database system segments to be deferred by the database system. The method includes incorporating the estimated parameters into an arrival rate meter (ARM). The method includes putting the ARM into effect.

Implementations may include one or more of the following. Each of the database system segments may be one of a user, an application, a workload, an SLG query, and a day of week. Extracting events may include identifying divergences in the means of the signals. Identifying divergences in the means of the signals may include determining that the means of the signals have crossed respective thresholds. Correlating events temporally to identify a time interval for which an ARM is helpful may include correlating times of events between respective signals. Selecting database system segments that effect key performance indicators associated with the time frame may include identifying key performance indicators that are affected during the time interval and identifying segments that affect the identified key performance indicators during the time interval. Identifying key performance indicators that are affected during the time interval may include identifying key performance indicators that have the highest coverage and hit rate for the time interval for which an arrival rate meter (ARM) is helpful. Coverage for a key-performance-indicator/resource-bound-condition pair may be defined to be a ratio of a total number of indicators impacting the key performance indicator to a total number of indicators for a resource bound condition, wherein an indicator may be a query being executed by the database system and showing poor performance. Hit rate for the key-performance-indicator/resource-bound-condition pair may be defined to be a ratio of the number of indicators for the key performance indicator that impact the resource bound condition to the total number of indicators for all key performance indicators that impact the resource bound condition. Identifying segments that affect the identified key performance indicators during the time frame may include identifying segments having the highest coverage and hit rate for each of the identify key performance indicators. Coverage for a segment/key-performance-indicator pair may be defined to be a ratio of a number of indicators for the segment that impact the key performance indicator to the total number of indicators for all segments impacting the key performance indicator, wherein an indicator may be a query being executed by the database system and showing poor performance. Hit rate for the segment/key-performance-indicator pair may be defined to be a ratio of the number of indicators for the segment that impact the key performance indicator to the total number of indicators for the segment.

In one aspect, a non-transitory computer-readable tangible medium, on which is recorded a computer program. The computer program includes executable instructions, that, when executed, perform a method. The method includes determining that a database system is resource bound resulting in a resource bound condition. The method includes identifying signals for the resources being bound in the database system. The method includes extracting events associated with the signals. The method includes correlating events temporally to identify a time interval for which an arrival rate meter (ARM) is helpful. The method includes selecting database system segments that effect key performance indicators associated with the identified time interval. The method includes estimating parameters for the selected database system segments to be deferred by the database system. The method includes incorporating the estimated parameters into an arrival rate meter (ARM). The method includes putting the ARM into effect.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Arrival Rate Monitor (ARM) regulates the flow of requests being admitted by a database management system (such as Teradata Active System Management (TASM)). A database management system (sometimes referred to as a "database system" or "system" herein) may include multiple database management systems. Arrival rate throttles, which is another name for ARMs, are described in U.S. Pat. No. 7,805,436, entitled "Arrival rate throttles for workload management," which issued on Sep. 28, 2010, and which is incorporated by reference.

ARMs identify the number of requests to be executed for a specified workload in a specified amount of time, where requests are divided among workloads by workload definitions. Conventionally, arrival rate monitors are set manually.

Figure 1:
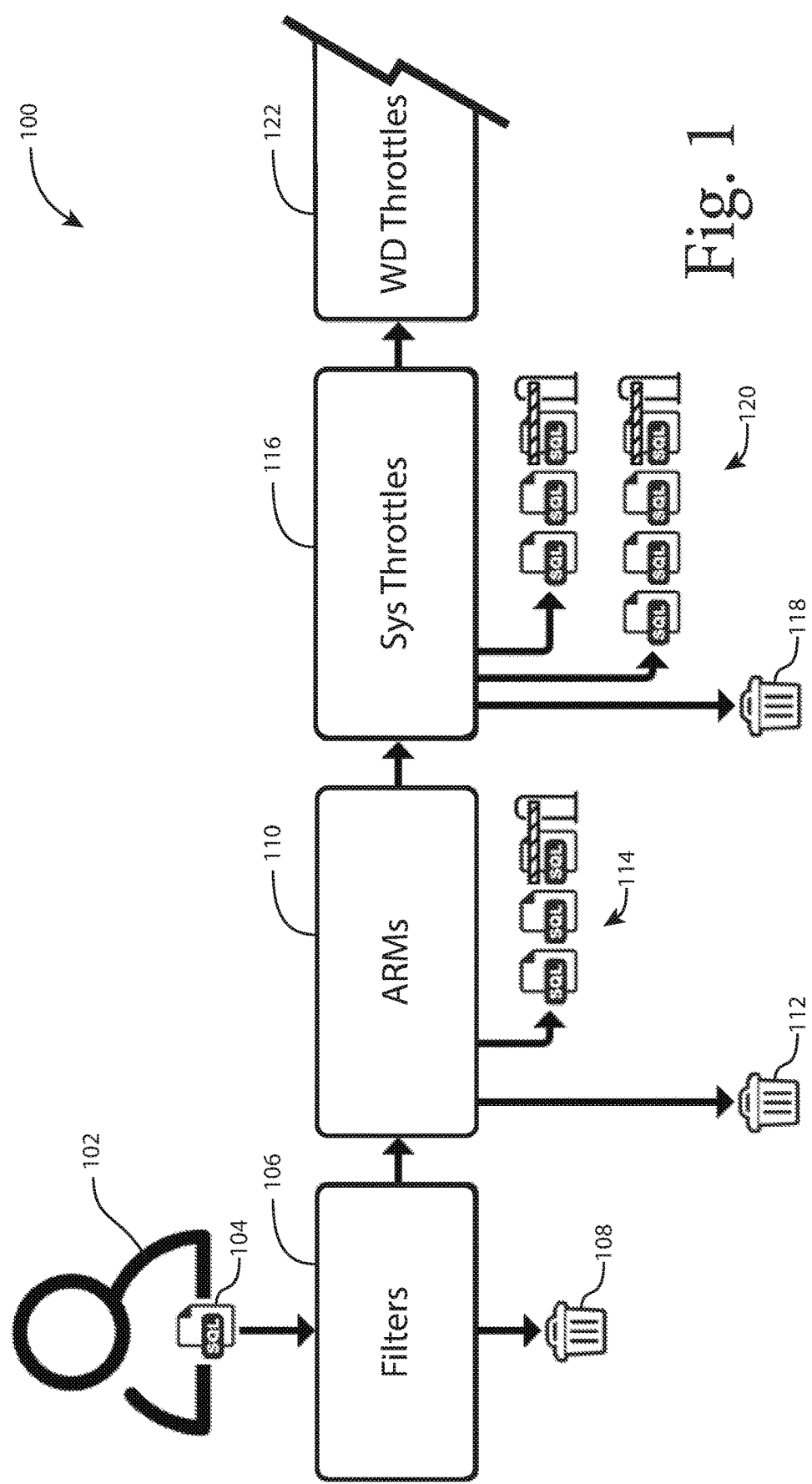
FIG. 1 is a diagram that illustrates how ARMs fit into an overall scheme for throttling the submission of requests to a database system.

FIG. 1 is a diagram that illustrates how ARMs fit into an overall scheme for throttling the submission of requests to a database system. In the overall scheme for throttling the submission of requests to a database system 100, a user or users 102 submits requests 104. The requests are filtered by a filter or filters 106, which trashes (represented by the trash symbol 108) some of the requests for a variety of reasons, such as failure to provide login credentials, or the like. The requests that survive the filter 106 are sent to one or more ARMs 110, which trashes (represented by the trash symbol 112) some of the requests, queues (represented by the queue 114) some of the requests and passes other requests along. Those requests that survive the ARMs (or that are submitted from the queue 114 after a delay), are submitted to system throttles 116, which trashes (represented by the trash symbol 118) some of the requests, queues (represented by the queues 120) some of the requests into one or more queues and passes other requests along. Those requests that survive the system throttles 116 (or that are submitted from the queues 120 after a delay), are submitted to workload definition (WD) throttles 122 that further throttle the requests according to workload definitions. As can be seen, requests are submitted to a number of throttles and/or filters before they are finally submitted to the database system for processing.

Figure 2:
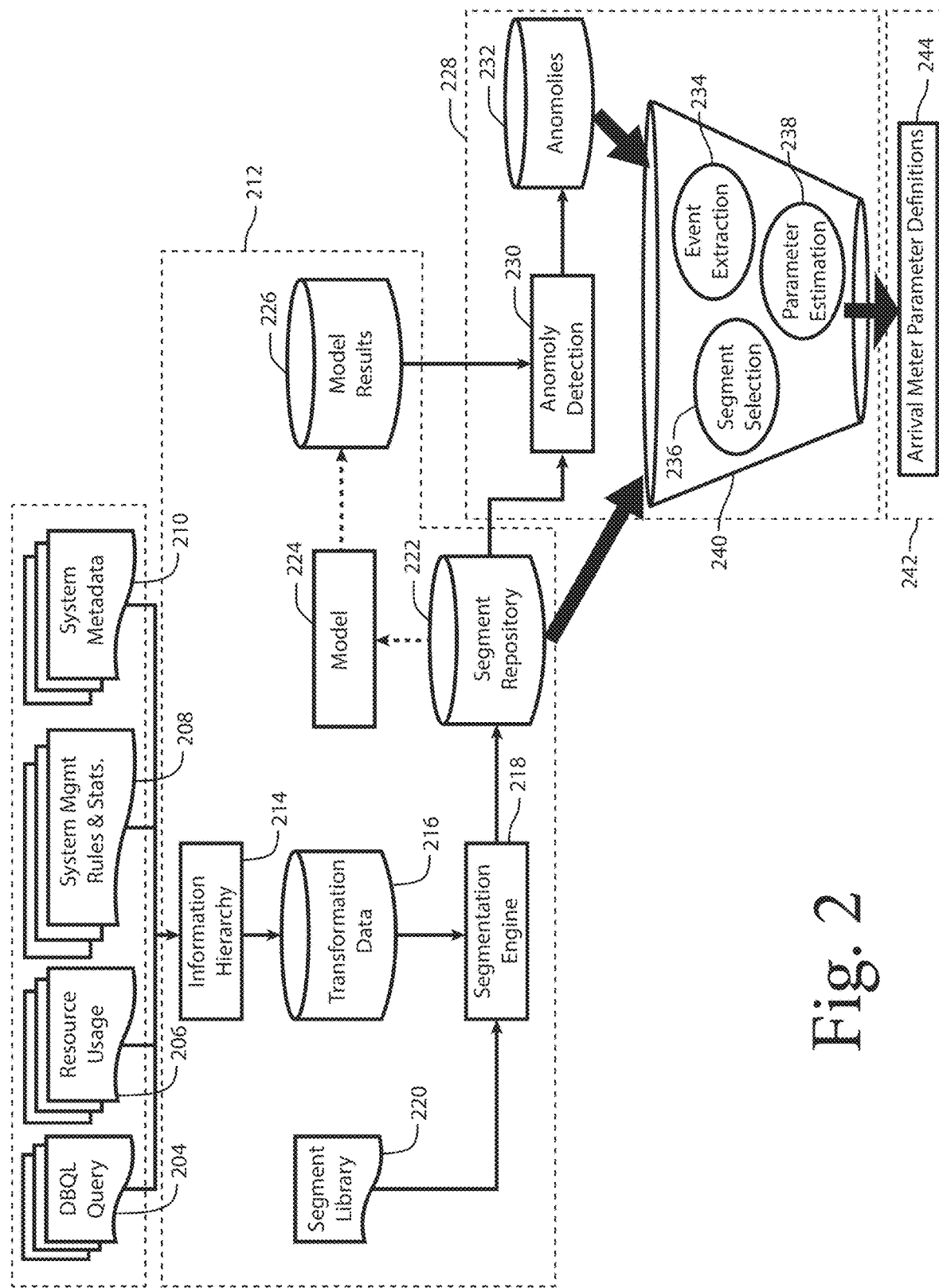
FIG. 2 is a diagram that illustrates the technique for automatically defining ARMs.

FIG. 2 is a diagram that illustrates the technique for automatically defining ARMs. Elements of the technique can be mapped to an Observe-Orient-Decide-Act (OODA) loop, which is a conceptual breakdown of operational processes useful in decision making. In this context, the observe elements 202 are the collection of data from the database system telemetry logs, including database query log (DBQL) data 204, resource usage data 206, system management (e.g. TASM) data 208, and system metadata 210.

The orient elements 212 of the OODA loop include transforming, summarizing, and modeling the collected data. An information hierarchy 214 of the collected data may be built. The data is then transformed to produce transformation data 216 that defines additional performance metrics, such as Parallel_Efficiency, Gating_Efficiency, BurnRate, and the like, and flag queries that show signs of poor performance, for example because of underperforming indicators. A segmentation engine 218 then aggregates counts of these indicators within predefined segments across time. Possible segments include user, application, workload, SLG_query, day_of_week, etc. The segment definitions may be stored in a segment library 220. The results of the segmentation engine may be stored in a segment repository 222. A model 224 defines how many indicators are expected within each segment based on the history of the segment stored in the segment repository 222, producing model results 226.

The decisions elements 228 of the OODA loop focus on whether performance is within an expected range (i.e., anomaly detection 230) to produce a data store of anomalies 232. The anomalies are analyzed to identify time windows that are good candidates for an ARM (i.e., Event Extraction 234), for example by using a signal detection technique to identify intervals of sustained shifts in the number of underperforming indicators on a system. The segment or segments that are the root cause of observed system-wide underperformance are then identified for the ARM, for example by giving each segment a "score" to quantify the contribution of that segment (i.e., Segment Selection 236). The rule qualification parameters for the ARM are then specified (Parameter Estimation 238). Such parameters include the query estimate/characteristics to qualify on (e.g., minimum total processing time), the query limit (number of queries allowed on system concurrently), the time unit (seconds, minutes, hour), the qualify time (number of seconds which arrival rate must continuously remain at the limit before new requests are held, such as 10 requests per minute for 120 seconds), etc. Event Extraction 234, Segment Selection 236, and Parameter Estimation 238 form a filter (represented by funnel 240) by which conditions for creation of an ARM are identified.

The action element 242 of the OODA loop includes defining one or more Arrival Meter Definitions 244, which the database management system (e.g., TASM) operationalizes to take action against incoming query statements (i.e., allow on the system, log event, defer the query, or abort the query).

Once the ARM is operationalized, its effectiveness can be evaluated. An ARM should cause the overall delay queue to go down, the defer queue for specific queries should go up, and poor user experience due to throttling should go down.

Determining a System is Resource Bound

Figure 3:
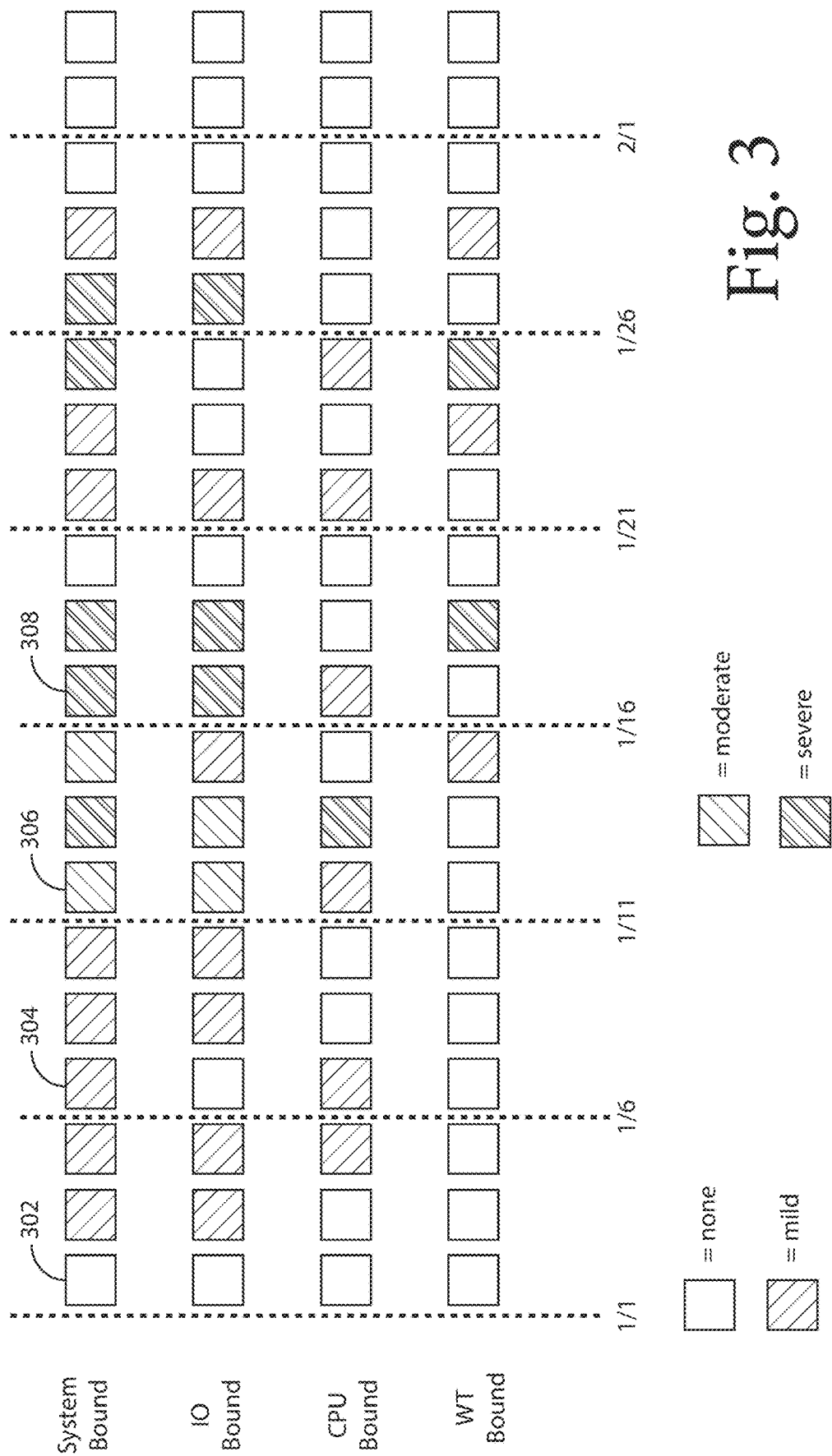
FIG. 3 is a chart illustrating the degree of boundedness for system resources used to determine if an ARM is warranted.

FIG. 3 is a chart illustrating the degree of boundedness for system resources used to determine if an ARM is warranted. A threshold aspect of the technique is to determine if an ARM is warranted. One approach is to assess the system daily (or over another period, such as hourly or weekly) as shown in FIG. 3 to determine if the system is input/output (IO), central processing unit (CPU) or worker task (WT, e.g., Teradata's amp worker tasks (AWTs)) bound. It will be understood that other system characteristics than those listed may be assessed. Note that in FIG. 3, the block of time represented by each square represents more than a day. It will be understood that the granularity of the assessment can be more or less than that shown. As can be seen, boundedness may be characterized into one of four categories: none (e.g., block 302), mild (e.g., block 304), moderate (e.g., block 304), and severe (e.g., block 304); it will be understood that the number of categories can be greater than four or less than four. The degree of boundedness for each of the categories may be determined by applying a series of thresholds (e.g., a first threshold to separate "none" from "mild," a second threshold to separate "mild" from "moderate," and a third threshold to separate "moderate" from "severe"). If any one of the three boundedness conditions are met, the system may be determined to be bounded for the time period. The degree of boundedness for the time period may be determined to be the highest degree of boundedness for the three categories (IO, CPU, or WT).

The technique looks for patterns of boundedness that might be correlated with, for example, a day of the week, a time of day, a week during the month, etc. Recognizing a pattern may be limited to exact matches (e.g., the system is severely bound on Mondays) or fuzzy matches (e.g., the system is severely or moderately bound on Mondays or Tuesday mornings).

If such a pattern of boundedness is found, it may be decided to implement an ARM.

Extracting Events

Once it has been determined that an ARM should be implemented, signals are created and events are extracted. The signals generated may map the resources being bound (e.g., WT bound may be observed by the time processes are spent in flow control and the total number WTs exhausted at the end of a time interval). The signal may also cover both the cause and the effect (i.e., adverse impact) of the bounded situation. A Signal Based Event Detection algorithm is then executed to extract the time windows of interest. The selected signals have known correlations (positive or negative) with bounding of the system.

Figure 4:
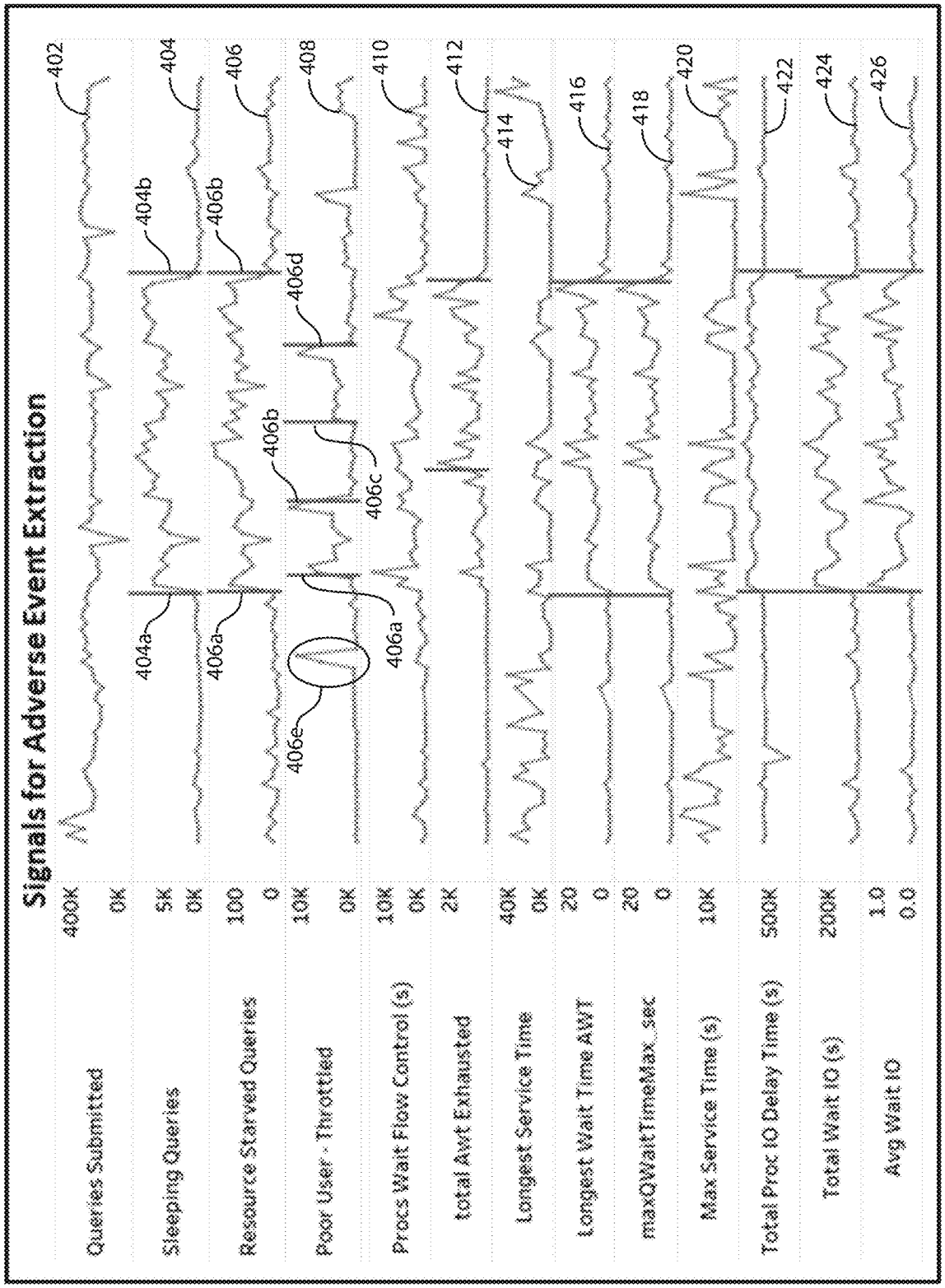
FIG. 4 illustrates signals for adverse event extraction.

FIG. 4 illustrates signals for adverse event extraction. FIG. 4 illustrates examples of candidate signals and the events that are automatically extracted from those signals. The example candidate signals shown in FIG. 4 are: Queries Submitted 402, Sleeping Queries 404, Resource Starved Queries 406, Poor User-Throttled 408, Procs Wait Flow Controls 410, total Awt Exhausted 412, Longest Service Time 414, Longest Wait Time AWT 416, maxQWaitTime-Max_sec 418, Max Service Time(s) 420, Total Proc IO Delay Time(s) 422, Total Wait IO (s) 424, and Avg Wait IO 426. It will be understood that these signals are merely examples and that fewer, more, or other signals may be used.

The automatically extracted events are shown in FIG. 4 by vertical lines cutting through the signals. The events may be detected by detecting a divergence in the mean of the signal, similar to the approach described in the article Breakout Detection in the Wild, published 24 Oct. 2014. As can be seen, the Sleeping Queries signal 404 experiences a divergence in the mean of the signal at events 404a (an increase in the mean) and 404b (a decrease in the mean). The Resource Starved Queries signal 406 experiences divergences in the mean of the signal at events 406a (an increase in the mean) and 406b (a decrease in the mean). More than one mean increase/mean decrease set may be found for a signal. For example, the Poor User-Throttled signal includes two such sets 408a/408b and 408c/408d. The degree of mean divergence required to identify a signal may be determined by a threshold that excludes some mean deviations. For example, the excursion 408e in the Poor User-Throttled signal 410, while a mean divergence, is not a large enough mean divergence to trigger identification of an event or events. Similarly, the Procs Wait Flow Control (s) signal and the Max Service Time (s) signal includes mean deviations that do not trigger identification of an event. Other events are shown in FIG. 4 but are not numbered.

Figure 5:
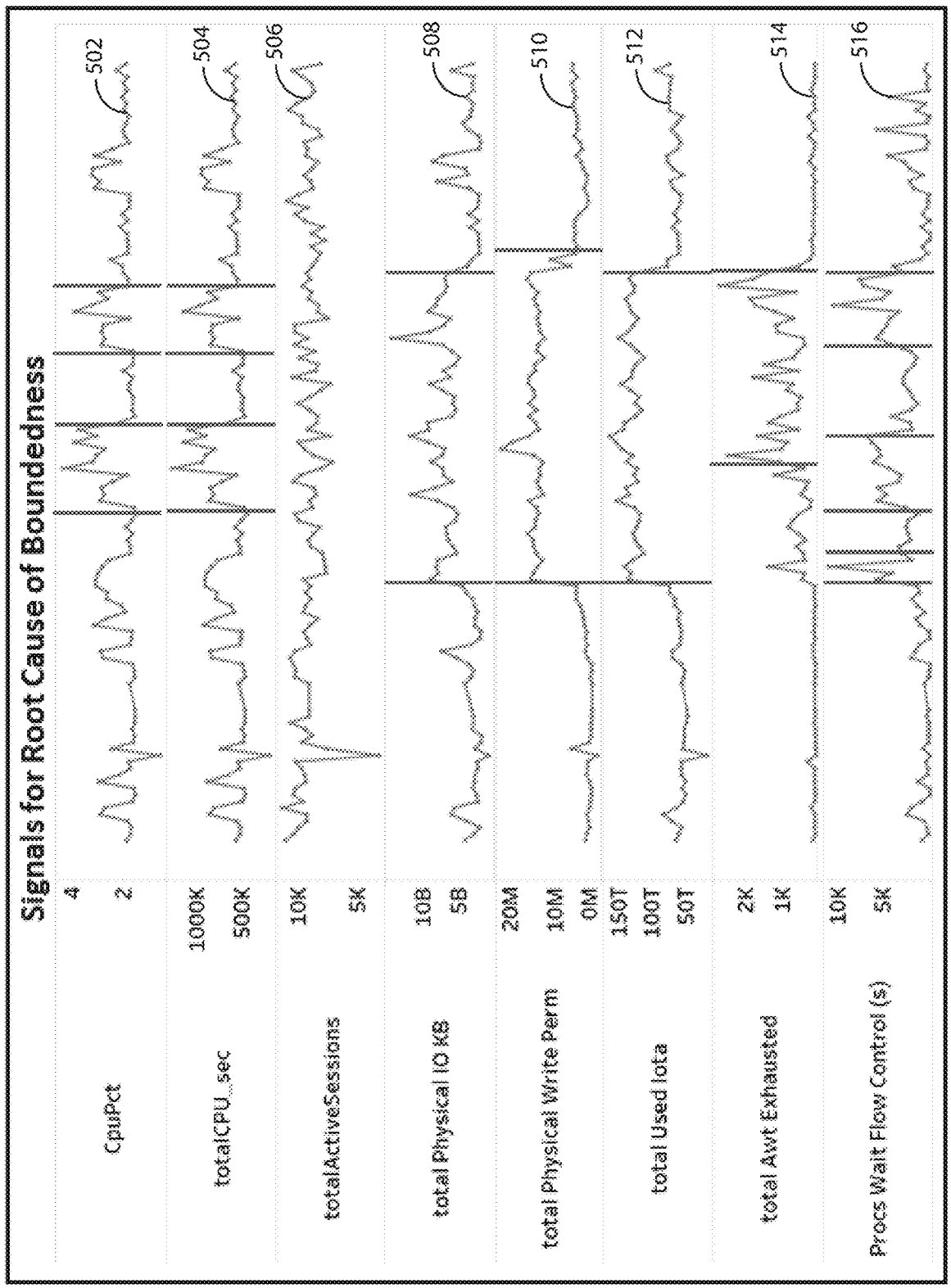
FIG. 5 illustrates signals for root cause of boundedness.

FIG. 5 illustrates signals for root cause of boundedness. The signals shown in FIG. 5 are CpuPct 502, totalCPU_sec 504, totalActiveSessions 506, totalPhysicalIOKB 508, totalPhysicalWritePerm 510, totalUsediota 512, totalAwtExhausted 514, and ProcsWaitFlowControl(s) 516. As with the adverse events illustrated in FIG. 14, events are shown as vertical lines cutting through the signals.

Temporal Event Correlation

The signals illustrated in FIGS. 4 and 5 are independent; that is, each signal is not derived from or dependent on the other signals. Once the events have been extracted from the independent signals shown in FIGS. 4 and 5, the technique looks for time intervals across the events that are correlated in order to reconcile the events across the different signals.

For example, referring to FIGS. 4 and 5, it can be seen that events for Sleeping Queries signal 404, Resource Starved Queries signal 406, and the IO metrics signals (i.e., Total Proc IO Delay Time(s) signal 422, Total Wait IO (s) signal 424, and Avg Wait IO signal 426) are correlatable to a single event, as each of these signals has an opening event and a closing event that occur at about the same time. The Poor User-Throttled signal 408 and the CPU metrics signals (i.e., the CpuPct signal 502 and the totalCPU_sec signal 504) are correlatable to two separate events. Other such correlatable events may be identified among the signals shown in FIGS. 4 and 5.

Correlatable events may have the same start time but vary in their end times, such as the events illustrated in total-PhysicalIOKB signal 508, totalPhysicalWritePerm signal 510, and the totalUsediota signal 512.

The results of the temporal event correlation are the time interval for the ARM definition, any day of week context for the ARM definition, specific key performance indicators (KPIs) and resource consumption metrics that are expected to be reduced when the ARM is implemented.

Automated Segment Selection

Once the time interval, day of week context, and KPIs/metrics of interest are known, the technique identifies the segment or segments to target with the ARM definition. Segments identify the classification types (e.g., user, application, workload) for the ARM definition.

Automated Segmentation Selection may be executed in multiple passes. The first pass may focus on identifying the KPIs that have the highest coverage and hit rate for the occurrence of the resource bound condition in the time interval of interest. "Coverage" for a KPI/resource-bound-condition pair is defined to be the ratio of the total number of indicators (e.g., queries showing signs of poor performance) impacting the KPI to the total number of indicators for the resource bound condition:

$$\text{Coverage}_{KPI\_j\_resource\_bound\_condition\_k} = \frac{\text{indicators}_{KPI\_j\_resource\_bound\_condition\_k}}{\text{indicators}_{all\_KPIs\_resource\_bound\_condition\_k}}$$

where:

$\text{Coverage}_{KPI\_j\_resource\_bound\_condition\_k}$ is the Coverage for the jth KPI as it impacts the kth resource bound condition, $\text{indicators}_{KPI\_j\_resource\_bound\_condition\_k}$ is the number of indicators for the jth KPI as they impact the kth resource bound condition, and $\text{indicators}_{all\_KPIs\_resource\_bound\_condition\_k}$ is the number of indicators for all KPIs as they impact the kth resource bound condition.

"Hit rate" for a KPI/resource-bound-condition pair is defined to be the ratio of the number of indicators for the KPI that impact the resource bound condition to the total number of indicators for all KPIs that impact the resource bound condition:

$$\text{Hit\_rate}_{KPI\_j\_resource\_bound\_condition\_k} =$$

-continued $$\frac{indicators_{KPI\_j\_resource\_bound\_condition\_k}}{indicators_{KPI\_j\_all\_resource\_bound\_condition}}$$

where

Hit_rate$_{KPI\_j\_resource\_bound\_condition\_k}$ is the Hit Rate for the jth KPI and the kth resource bound condition, indicators$_{KPI\_j\_resourc\_bound\_condition\_k}$ is the number of indicators for the jth KPI that impact the kth resource bound condition, and indicators$_{KPI\_j\_all\_resource\_bound\_conditions}$ is the number of indicators for the jth KPI for all resource bound conditions.

For example, a system may have 1000 indicators for resource bound condition 1, 100 of which are associated with a KPI$_1$, and KPI$_1$ may have a total of 200 indicators for all resource bound conditions. In that case, KPI$_1$ has a coverage of 10 percent (100/1000×100) and a hit rate of 50 percent (100/200×100).

The coverages and hit rates for each KPI may be normalized and the normalized coverage and normalized hit rate may be combined (e.g., by adding the normalized coverage and normalized hit rate) to produce a score. The KPIs are ranked by score and those with a score above a threshold are used in the second pass.

The second pass may focus on the specific segment or segments having the highest coverage and hit rate effecting each of the KPIs identified in the first pass. "Coverage" for a segment/KPI pair is defined to be the ratio of the number of indicators for the segment that impact the KPI to the total number of indicators for all segments impacting the KPI:

$$Coverage_{segment\_i\_KPI\_j} = \frac{indicators_{segment\_i\_KPI\_j}}{indicators_{all\_segments\_KPI\_j}}$$

where:

Coverage$_{segment\_i\_KPI\_j}$ is the Coverage for the ith segment and the jth KPI, indicators$_{segment\_i\_KPI\_j}$ is the number of indicators for the ith segment that impact the jth KPI, and indicators$_{all\_segments\_KPI\_j}$ is the number of indicators for all segments that impact the jth KPI.

"Hit Rate" for a segment/KPI pair is defined to be the ratio of the number of indicators for the KPI to the total number of indicators for the segment:

$$Hit\_rate_{segment\_i\_KPI\_j} = \frac{indicators_{segment\_i\_KPI\_j}}{indicators_{segment\_i\_all\_KPIs}}$$

where

Hit_rate$_{segment\_i\_KPI\_j}$ is the Hit Rate for the ith segment and the jth KPI, indicators$_{segment\_i\_KPI\_j}$ is the number of indicators for the ith segment that impact the jth KPI, and indicators$_{segment\_i\_all\_KPIs}$ is the number of indicators for the ith segment for all KPIs.

For example, segment$_1$ may have a 1000 total indicators, 50 of which impact KPI$_1$ and KPI$_1$ may have a total of 2000 indicators from all segments. In that case, coverage for the segment/KPI pair is 2.5 percent (50/2000×100) and hit rate for the segment/KPI pair is 5 percent (50/1000×100).

The coverages and hit rates for each segment are normalized and the normalized coverage and normalized hit rate are combined to produce a score. The segment with the highest score for the KPI is identified.

Figure 6:
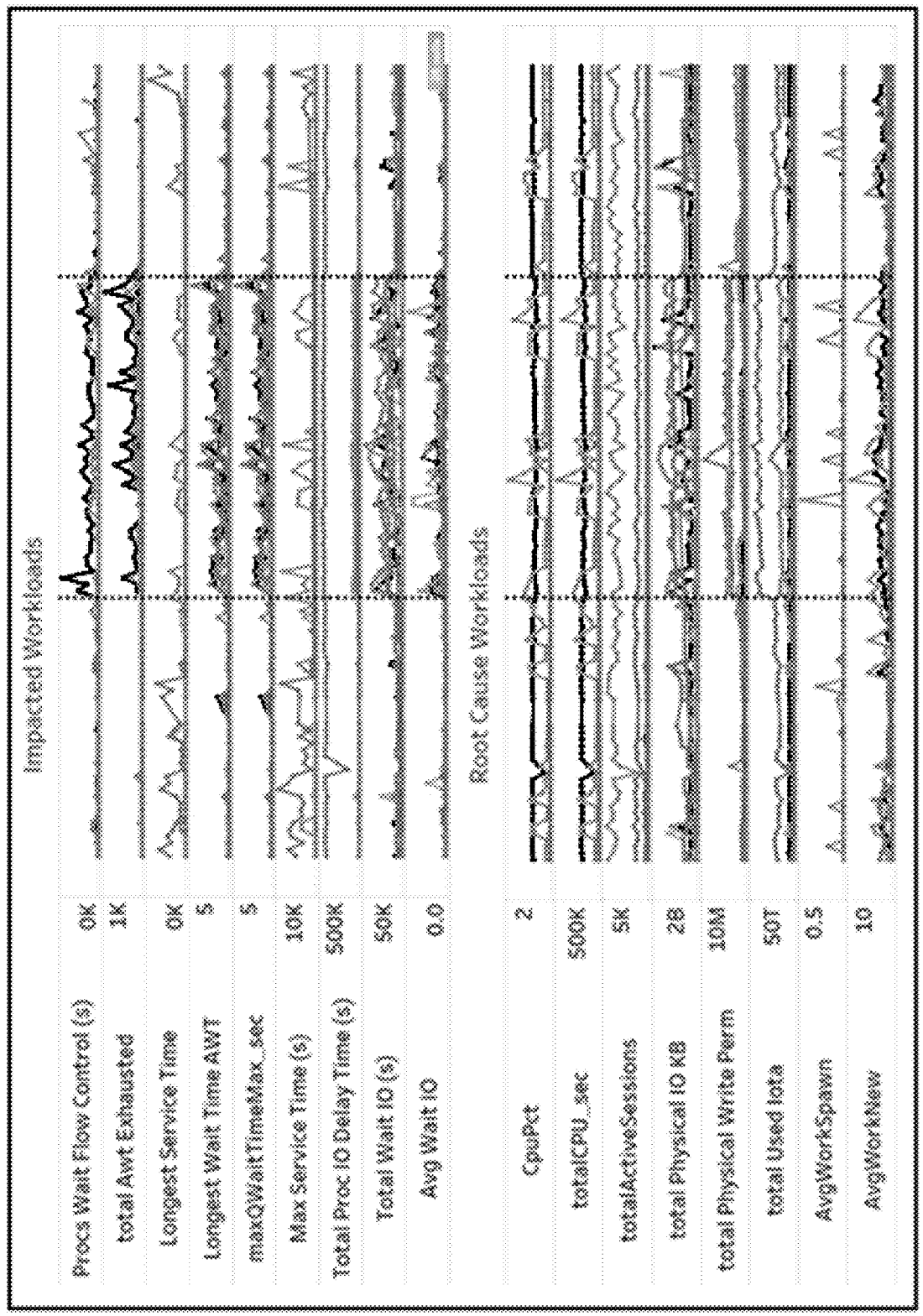
FIG. 6 illustrates the results of selecting KPIs and segments.

FIG. 6 illustrates the results of selecting KPIs and segments. Two resource bound conditions (Impacted Workloads and Root Cause Workloads) are shown, with the KPIs for each arrayed along the vertical axis for each. The horizontal axis for each KPI displays several curves, each representing a segment, with the selected segment for each segment having a bolder print. The time interval of interest is demarked by dashed horizontal lines.

Parameter Estimation

At this point in the processing chain, the time interval, KPIs, and micro-segments on interest, along with any day of the week context have been identified. The final step for the automatically creating the ARM definitions is to estimate the parameters for deferral. Specifically, query classification thresholds, limits on the concurrency, and the time interval length for ARM evaluations are determined. To achieve this, segment analysis between the time intervals for resource bound and non-resource bound is performed. This analysis may be done using 1-D clustering techniques, such as Kernal Density Estimation (Automated 1D Clustering) to identify sub-populations based on query performance. In this approach, clusters unique to bounded time intervals are automatically identified, which provide the basis for estimating the remaining parameters for rule definition.

For example, an application that is the root cause of IO bounding for a 3-hour period every day is running a subset of queries where the TDWM Estimate Total Time is about 600 seconds, while the same application during the time intervals with no bounding has TDWM Estimated Totals Times less than 60 seconds. In the case, the case the 1-D clustering discovers the clusters for TDWM Estimate Total Time for bounded time intervals and unbounded time intervals, while a decision logic identifies the cluster of queries with the above 600 second time estimates. The final component of the parameter estimation step determines that the classification criteria for the ARM rule is a time estimate greater than 100 seconds (note: anything between 60 seconds and 600 seconds would work) for the specified application and that the arrival meter is set to a 1 query limit with an interval length of 600 seconds. The result of these parameters is then a rule that only allows 1 query on the system every 10 minutes that corresponds to the specification application with an estimated total time greater than 100 seconds.

Automatically Generate an ARM

Upon completion of Parameter Estimation, all of the information to automatically generate an ARM is available. The ARM is generated and put into effect.

ARM Performance Evaluation

Performance of the ARM is evaluated by comparing the various metrics described above before and after the ARM is put into effect.

Figure 7:
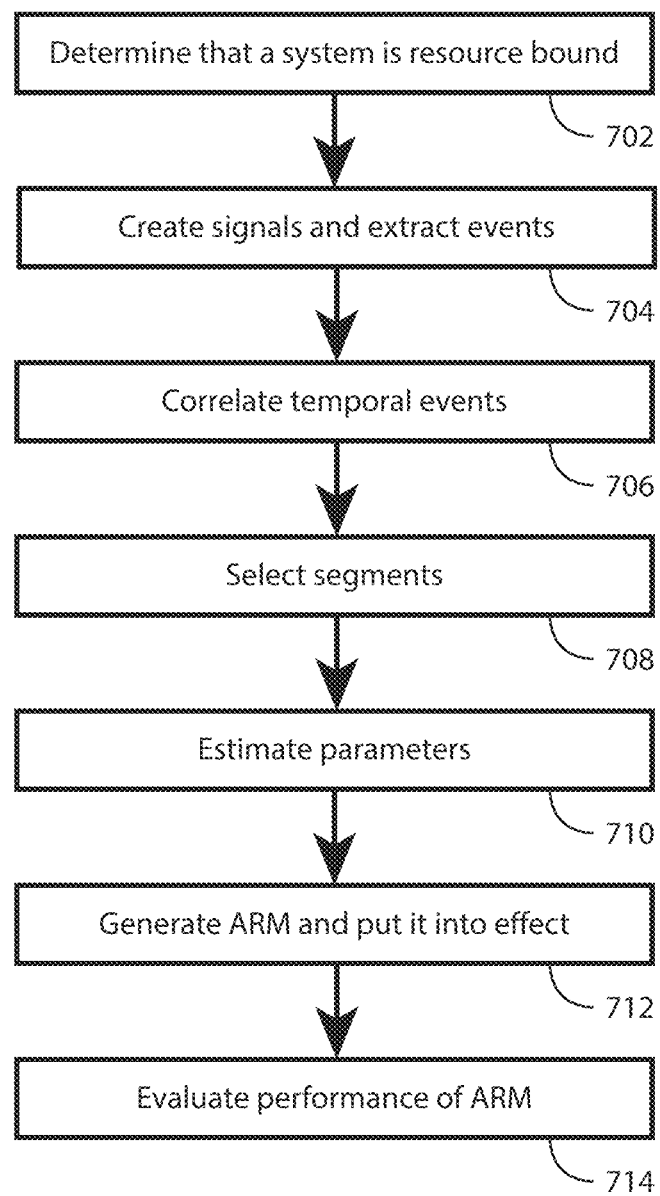
FIG. 7 is a flow chart illustrating automatically generating an ARM.

FIG. 7 is a flow chart illustrating automatically generating an ARM. In use, it is determined that a system is resource bound resulting in a resource bound condition 702. Events associated with the signals are extracted 704. Temporal events are correlated to identify a time interval for which an ARM is helpful 706. Segments that effect key performance indicators associated with the identified time interval are automatically selected 708. Parameters for the selected database system segments to be deferred by the database system are estimated 710. An ARM is generated by incorporating the estimated parameters into the ARM and the ARM is put into effect 712. Performance of the ARM is evaluated 714.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   determining that a database system is resource bound resulting in a resource bound condition;
   identifying signals for the resources being bound in the database system;
   extracting events associated with the signals;
   correlating events temporally to identify a time interval for which an arrival rate meter (ARM) is helpful;
   selecting database system segments that effect key performance indicators associated with the identified time interval;
   estimating parameters for the selected database system segments to be deferred by the database system;
   incorporating the estimated parameters into an arrival rate meter (ARM);
   putting the ARM into effect;
   wherein selecting database system segments that effect key performance indicators associated with the time frame comprises:
      identifying key performance indicators that are affected during the time interval; and
      identifying segments that affect the identified key performance indicators during the time interval;
   wherein identifying segments that affect the identified key performance indicators during the time frame comprises:
      identifying segments having the highest coverage and hit rate for each of the identified key performance indicators;
   wherein:
      coverage for a segment/key-performance-indicator pair is defined to be a ratio of a number of indicators for the segment that impact the key performance indicator to the total number of indicators for all segments impacting the key performance indicator, wherein an indicator is a query being executed by the database system and showing poor performance; and
      hit rate for the segment/key-performance-indicator pair is defined to be a ratio of the number of indicators for the segment that impact the key performance indicator to the total number of indicators for the segment.

2. The method of claim 1 wherein each of the database system segments is one of a user, an application, a workload, an SLG_query, and a day of week.

3. The method of claim 1 wherein extracting events comprises identifying divergences in the means of the signals.

4. The method of claim 3 wherein identifying divergences in the means of the signals comprises determining that the means of the signals have crossed respective thresholds.

5. The method of claim 1 wherein correlating events temporally to identify a time interval for which an ARM is helpful comprises correlating times of events between respective signals.

6. The method of claim 1 wherein identifying key performance indicators that are affected during the time interval comprises:
   identifying key performance indicators that have the highest coverage and hit rate for the time interval for which an arrival rate meter (ARM) is helpful.

7. The method of claim 6 wherein:
   coverage for a key-performance-indicator/resource-bound-condition pair is defined to be a ratio of a total number of indicators impacting the key performance indicator to a total number of indicators for a resource bound condition, wherein an indicator is a query being executed by the database system and showing poor performance; and
   hit rate for the key-performance-indicator/resource-bound-condition pair is defined to be a ratio of the number of indicators for the key performance indicator that impact the resource bound condition to the total number of indicators for all key performance indicators that impact the resource bound condition.

8. A non-transitory computer-readable tangible medium, on which is recorded a computer program, the computer program comprising executable instructions, that, when executed, perform a method comprising:
   determining that a database system is resource bound resulting in a resource bound condition;
   identifying signals for the resources being bound in the database system;
   extracting events associated with the signals;
   correlating events temporally to identify a time interval for which an arrival rate meter (ARM) is helpful;
   selecting database system segments that effect key performance indicators associated with the identified time interval;
   estimating parameters for the selected database system segments to be deferred by the database system;
   incorporating the estimated parameters into an arrival rate meter (ARM);
   putting the ARM into effect;
   wherein selecting database system segments that effect key performance indicators associated with the time frame comprises:
      identifying key performance indicators that are affected during the time interval; and
      identifying segments that affect the identified key performance indicators during the time interval;
   wherein identifying key performance indicators that are affected during the time interval comprises:

identifying key performance indicators that have the highest coverage and hit rate for the time interval for which an arrival rate meter (ARM) is helpful;

wherein:

coverage for a key-performance-indicator/resource-bound-condition pair is defined to be a ratio of a total number of indicators impacting the key performance indicator to a total number of indicators for a resource bound condition, wherein an indicator is a query being executed by the database system and showing poor performance; and hit rate for the key-performance-indicator/resource-bound-condition pair is defined to be a ratio of the number of indicators for the key performance indicator that impact the resource bound condition to the total number of indicators for all key performance indicators that impact the resource bound condition.

9. The computer program of claim 8 wherein each of the database system segments is one of a user, an application, a workload, an SLG_query, and a day of week.

10. The computer program of claim 8 wherein extracting events comprises identifying divergences in the means of the signals.

11. The computer program of claim 10 wherein identifying divergences in the means of the signals comprises determining that the means of the signals have crossed respective thresholds.

12. The computer program of claim 8 wherein correlating events temporally to identify a time interval for which an ARM is helpful comprises correlating times of events between respective signals.

13. The computer program of claim 8 wherein identifying segments that affect the identified key performance indicators during the time frame comprises:

identifying segments having the highest coverage and hit rate for each of the identified key performance indicators.

14. The computer program of claim 13 wherein:

coverage for a segment/key-performance-indicator pair is defined to be a ratio of a number of indicators for the segment that impact the key performance indicator to the total number of indicators for all segments impacting the key performance indicator, wherein an indicator is a query being executed by the database system and showing poor performance; and hit rate for the segment/key-performance-indicator pair is defined to be a ratio of the number of indicators for the segment that impact the key performance indicator to the total number of indicators for the segment.

\* \* \* \* \*